United States Patent Office 3,539,365
Patented Nov. 10, 1970

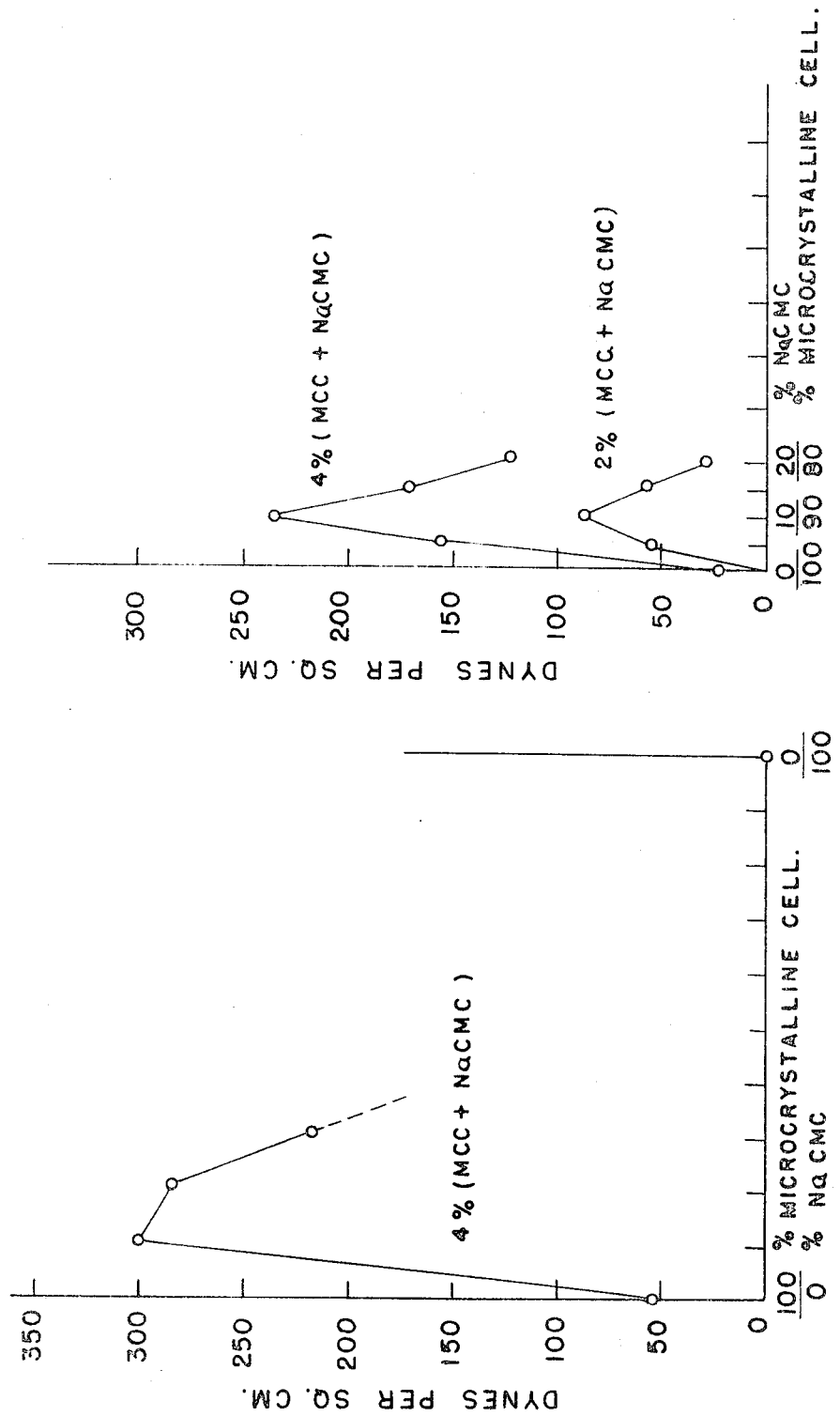

3,539,365
DISPERSING AND STABILIZING AGENT COMPRISING β-1,4 GLUCAN AND CMC AND METHOD FOR ITS PREPARATION
Harry W. Durand, Muscatine, Iowa, and Edwin G. Fleck, Jr., Wallingford, and George E. Raynor, Jr., Media, Pa., assignors to FMC Corporation, Philadelphia, Pa., a corporation of Delaware
Filed Feb. 13, 1967, Ser. No. 615,621
Int. Cl. C08b 21/30, 23/00
U.S. Cl. 106—197
9 Claims

ABSTRACT OF THE DISCLOSURE

Partially degraded cellulose is subjected to attrition in the presence of an aqueous medium at a high solids concentration so as to free the microcrystalline cellulose and attrition continued as the solids content is reduced by the addition of water. The disintegrated microcrystalline cellulose is recovered by drying an aqueous suspension thereof or a mixture thereof with water containing dissolved CMC having a D.S. of 0.75±0.15 to form a dry product easily redispersible in aqueous media to form gels.

---

Figure 3:
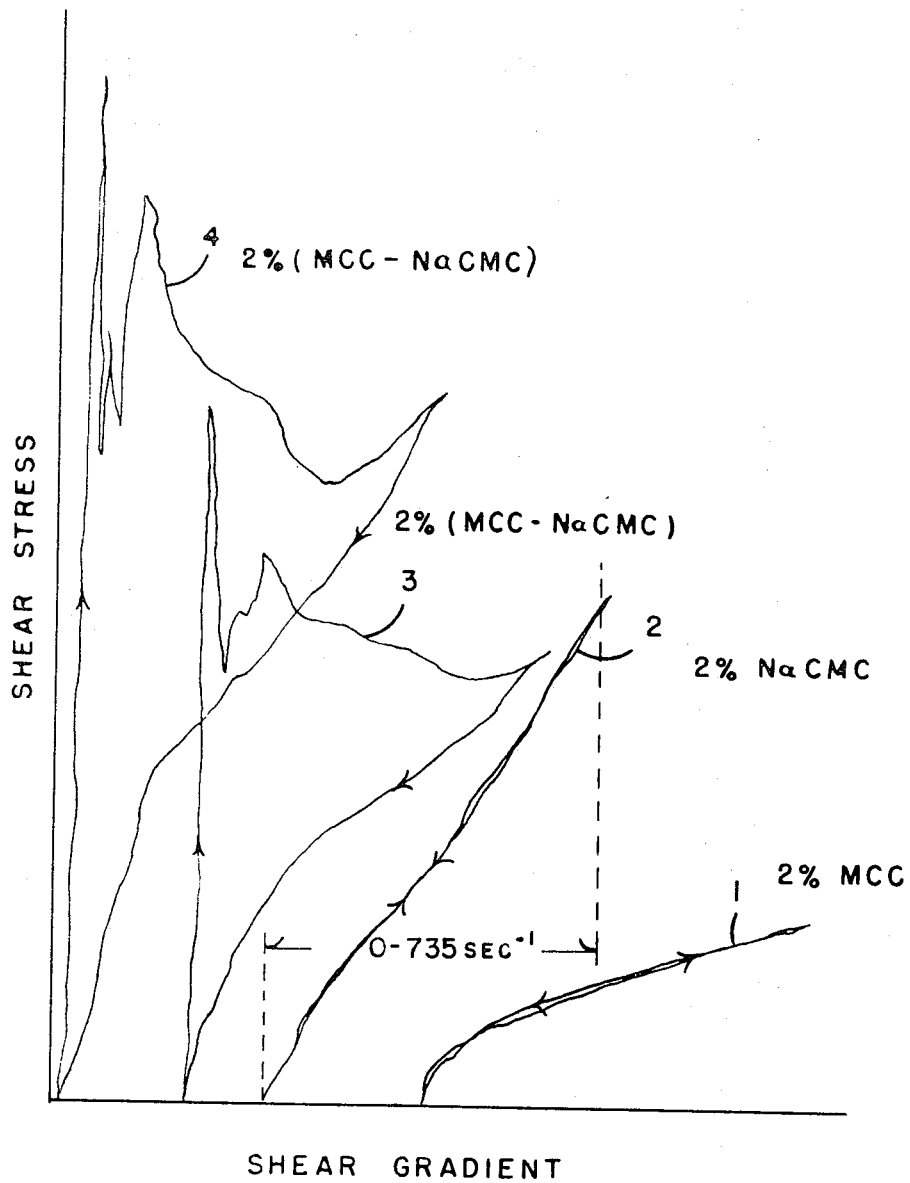

This invention relates to a new solid dispersing and stabilizing agent and a method of making the same from a holocellulose source.

It is known that holocellulose materials may be degraded by treatment with acids, alkalis or enzymes to provide a β-1,4 glucan that subsequently may be disintegrated mechanically to produce a material which is water-insoluble but water-dispersible. When the amount of disintegration is sufficient so that at least 1% by weight of the β-1,4 glucan has a particle size not exceeding about 1 micron, the material is then capable of forming a stable dispersion in aqueous and other media.

The holocellulose source or raw material is cellulose containing plant life and includes wood, wood pulps such as bleached sulfite and sulfate pulps, cotton, cotton linters, flax, hemp, ramie, bast or leaf fibers and regenerated forms of cellulose, such as rayon and cellophane and the like. The water-insoluble, water-dispersible material consists of a major portion of β-1,4 glucan and if the source material is too low in β-1,4 glucan content, it is necessary to remove at least some of the other components to provide a product containing at least a major portion of β-1,4 glucan.

The water-insoluble, water-dispersible β-1,4 glucan-containing material is prepared from the source material by a combination of a chemical degradation and mechanical attrition. Chemical degradation may be effected by any of the common well known methods. A specific method for the commercial production of this type of dispersible material is disclosed in U.S. Pat. 2,978,446. In this method, the source material, i.e., native or regenerated forms of cellulose, is subjected to a 2.5 N hydrochloric acid solution at its boiling point for 15 minutes. Obviously, more dilute acid may be utilized by raising the temperature of the mass while maintaining the mass under an elevated pressure. Other known methods for degrading the cellulose source materials by the use of other acids and by alkalis are also satisfactory. The degraded material is subsequently attrited preferably in the presence of an aqueous medium so as to provide the required small particle size.

The amount of energy required for the necessary attrition will be dependent upon the specific raw material. For example, a dilute hydrochloric acid treatment of regenerated forms of cellulose produces a material substantially all of which is attritable to the desired particle size by merely dispersing the same in an aqueous medium with a conventional electrically driven kitchen beater in a matter of a few minutes. Wood pulps and cotton linters, however, after a similar hydrolysis treatment require a substantial amount of energy input and, accordingly, a greater attrition period is used in equipment which is more severe in its attriting action. The relative proportions of larger sized particles in the degraded material also varies inversely with the severity of hydrolysis of the source material. Accordingly, the amount of energy required for the required attrition will also vary inversely with the severity of hydrolysis of the source material.

The mechanical attrition may be effected by the use of various standard equipment such as kitchen mixers, planetary mixers, ball mills, attrition mills, high speed shearing devices, such as a Waring Blendor and the like. Also, the residue of the hydrolysis treatment preferably in the presence of an aqueous medium may be subjected to a shearing action and to a rubbing action between the particles by forcing the mixture of residue and aqueous medium through passages of limited cross section such as found in perforated plates. The attrition should be sufficient to produce a mass wherein at least about 1% by weight and preferably at least 30% of the particles have an average length not greater than about 1.0 micron as determined by electron microscopic examination. Some of the particles in such a mass may have a length or maximum dimension as low as a few hundredths of a micron.

For practical commercial purposes, it is, of course, desired to dry the attrited material. Conventional drying processes may be utilized. However, the dried product becomes hornified probably due to agglomeration of numbers of the smaller particles that become bonded together by hydrogen bonding forces during drying. These forces are second in strength only to primary valence bonds and, accordingly, when the dried product is to be redispersed in an aqueous medium, substantial amounts of energy are required to break the hydrogen bonds. Although it is possible by sufficient attrition to form stable dispersions of the dried products, the dispersions are quite sensitive to ionizable materials. In the use of the dried materials in various food products, such as salad dressings, mayonnaise, frozen desserts, toppings and the like, the presence of these dried materials may impart an undesirable gritty mouth feel generally termed a "chalky taste."

Aqueous dispersions of the attrited material are stable and the dispersed particles carry a very weak negative charge. The stability of the colloidal dispersions, however, is influenced by the presence of ions such as salts, acids, hard water and the like and by colloidal particles such as proteins which carry a positive charge. The presence of these types of substances tend to flocculate the dispersed particles.

One of the purposes of the present invention is to provide a method for the production of a colloidal form of β-1,4 glucan material having enhanced physical and colloidal properties.

Other objects and advantages of the invention will become apparent from the description and claims which follow.

In accordance with the present invention, a mechanically disintegrated, chemically degraded substance comprising a major portion of β-1,4 glucan is dispersed in an aqueous medium in the presence of water-soluble carboxymethyl cellulose and the resulting product is subsequently recovered in a dry form.

In the drawings:

FIGS. 1 and 2 are graphs illustrating the variation in the yield stress of dispersions containing microcrystalline cellulose and CMC with variations in the relative proportions of the microcrystalline cellulose and CMC; and FIG. 3 is a graph illustrating the flow properties of typical dispersions of microcrystalline cellulose and microcrystalline cellulose-CMC products of the present invention and a solution of CMC.

In order to simplify the description which follows, the term "cellulose" will be used to designate the $\beta$-1,4 glucan-containing materials.

The term "carboxymethyl cellulose" is used herein and in the claims in the usual commercial sense and refers to the sodium salt of carboxymethyl cellulose and in the description this salt will be designated as "CMC."

The $\beta$-1,4 glucan may be derived by any desired chemical degradation method applied to a selected cellulose material. Upon completion of the desired degradation, the residue is collected as a filter cake and is thoroughly washed to remove soluble impurities. The washed cake, preferably containing about 40% solids, is then subjected to mechanical disintegration. In the chemical degradation treatment and subsequent washing, micro-crystalline cellulose is freed by cleaving the cellulose chains in the amorphous regions but the individual crystallites still remain bound together due to hydrogen bonding. These individual crystallites must be separated or peeled from the treated fiber or fragment. During the disintegration, newly created surfaces are formed as the microcrystals are separated from the degraded material and unless the individual microcrystals are maintained in a separated condition they will re-bond. In order to obtain an efficient shearing, the solids content of the mass being subjected to disintegration should be sufficiently high to provide an efficient transfer of the shear forces. On the other hand, the solids content should not be so high as to allow the separated microcrystals to coalesce and form large aggregates owing to insufficient water present to hydrate with the newly created surfaces of the microcrystals.

In accordance with the preferred procedure, the water-soluble CMC is introduced in a dry powder form during this stage of the attrition process. Alternatively, a concentrated solution or a water paste of the water-soluble CMC is introduced, the water content of the solution or paste being taken into account to provide the required water content of the mass being attrited. The water content also must be sufficient so as to hydrate the CMC during the attrition process. As attrition proceeds, sufficient amounts of the dissolved CMC should be present so as to at least partially coat the microcrystals as they are freed from the degraded fibers or particles.

It has been discovered that in order to effect the required attrition, to effectively separate the microcrystals and maintain them in individual state and to hydrate the CMC, the solids content of the mass when first subjected to attrition should be at least 35% but should not exceed about 60%. When attrition is carried out at above about 50% solids, then the solids content must be reduced by adding water slowly while still continuing the attrition in order to hydrate the surface of the microcrystals as the aggregates formed by the attrition at high solids are separated by further attrition at the lower solids content.

Upon completion of the attrition and mixing operations, the mass is then dried. Any desired drying method may be used. A particularly satisfactory drying method is a drum drying method wherein the disintegrated mass is spread as a thin film, for example, about 0.01 inch in thickness, on heated drums. In order to facilitate the spreading of the wet mass as a continuous film on the drying drum, the mass is subjected to additional attrition and mixing as additional water is added so as to reduce the solids content of the mass to a range of from about 25% to 35%. This further attrition continues the freeing of the microcrystals and additional CMC is hydrated and dissolved so as to maintain the freed microcrystals as individual, discrete particles and to at least partially coat the microcrystals with CMC. Both cellulose and CMC will absorb moisture from the atmosphere and, accordingly, the material is dried to a moisture content of about 3% to 10%. The dried film is removed and may be readily ground to a powder and is preferably ground to a size such that all of the material passes through a 60 mesh screen and it is then collected in a suitable storage bin or in desired packages.

Alternatively, upon completion of the attrition and mixing operations, the material may be transferred to a suitable mixing vessel and water added to form a slurry containing from 3% to 10% solids. The slurry is then spray dried to a moisture content of about 3% to 10% and a dry powder collected.

Alternatively, attrition may be effected in the absence of CMC. Obviously, the solids content should be sufficiently high to provide an efficient transfer of the shear forces but should also be low enough to prevent coalescence of the separated microcrystals and maintain the freed microcrystals as individual, discrete particles. Upon completion of attrition, a solution of CMC is added, preferably slowly, and attrition and mixing continued so as to provide a thorough mixing and at least partially coat the individual microcrystals. Alternatively, dry CMC may be added making certain that sufficient water is present to hydrate the CMC and keep the particles separated. Where the product is to be drum dried, the solution of CMC may provide the water necessary to reduce the solids content to a level necessary to facilitate the spreading of a continuous film of the wet mass on the surface of the drying drum. When dry CMC is added, water must be added to obtain the desired solids content. If the product is to be spray dried, the mass is transferred to a suitable mixer and water added to form a slurry containing 3% to 10% solids and then spray drying.

For the purposes of the present invention, the CMC should have sufficient unsubstituted hydroxyl groups so that the CMC can hydrogen bond to the individual cellulose microcrystals upon drying. The substituent groups should be sufficient to impart water-solubility. The CMC necessary for the purposes of this invention has a degree of substitution of $0.75\pm0.15$. In the class of so-called low and medium viscosity grades of CMC, the viscosity of 2% solutions may vary within a range of about 20 to 800 cps. In the class of high viscosity grades of CMC, the ciscosity of 1% solutions may vary up to about 2,200 cps. CMC having a degree of substitution outside this range does not prevent hornification or partial hornification of the cellulosic material during drying. This effect on the dried material may be termed a barrier effect and an effective barrier prevents the irreversible bonding or hornification of the microcrystalline cellulose during drying. Subsequently, when the dried material is placed in water and subjected to a mixing or beating step, the dried material readily disperses in the water and forms a firm gel.

The effectiveness of CMC's of various degrees of substitution is illustrated in the Table I. In each instance, a mixture of disintegrated microcrystalline cellulose and the specific CMC was formed as described above, the mixture containing approximately nine parts of the cellulose to one part of the CMC and the product was formed by spray drying. In forming a gel from the dried products, distilled water was used as the liquid medium and 10% of the dried products added to distilled water in a conventional household type mixer, specifically a Mixmaster, and subjected to a beating for a period of about 15 minutes. The viscosity for each of the gels is set forth in the table. It will be noted that in each of the dried products with the exception of that prepared with the CMC having a degree of substitution of $0.75\pm0.15$, the products showed hornification and the gels were, in effect, unsatisfactory.

TABLE I

| CMC, D.S. | 10% gel viscosity [1] | Gel characteristics |
| --- | --- | --- |
| No CMC | 0 | No gel formed. |
| 0.43±0.05 | 2 | Hornification excessive, dispersion thin, very chalky. |
| 0.75±0.15 | 107 | Excellent, barrier effectiveness, no hornification, firm, non-chalky gel formed. |
| 0.90±0.05 | 40 | Some hornification, soft, non-chalky gel formed. |
| 1.30±0.10 | 20 | Hornification excessive, soft, slightly chalky jelly formed. |

[1] Brookfield units.

The foregoing table illustrates that the specific CMC is the most effective material to prevent hornification and allow the dried product to be converted into a desired form of gel. Considering only the function of an additive to serve as a barrier agent, other substances such as, for example, methyl cellulose, hydroxypropyl methyl cellulose, guar gum, alginates, sugars, surfactants and other hydrocolloids may have a slight barrier action when added in appreciably higher proportions. For example, dextrose, sucrose, lactose and sorbitol when present in amounts of 1 part of the sugar to 3 parts of the disintegrated microcrystalline cellulose formed gels at 20% solids concentration, however, the viscosities of the gels did not exceed 6 B.U.

It is also desirable that the additive impart to the dry product a spontaneous swelling upon addition of the product to water. A dry, colloid forming product should be capable of forming a colloid with a minimum amount of shear. In other words, in addition to the ability of the additive to prevent hornification during drying, the additive should also function as a dispersant when the dry product is added to water or a mixture of water and a water-miscible polar solvent such as, for example, ethanol. Of the aforementioned possible additives, only the CMC's having a D.S. of at least 0.75±0.15 impart this characteristic to the dry product. This ease of dispersing the product is demonstrated visually by a comparison of the action of tablets upon dropping tablets into water. The tablets are formed by pressing dry powders at 2000 p.s.i. When tablets formed of spray dried, attrited microcrystalline cellulose without an additive are dropped into water, the tablet begins to swell and to flake and disintegrate within a matter of a few seconds and the flakes remain in a small mound. Upon agitation, as with a spatula, the flakes become broken into small fragments and as soon as agitation is arrested, the fragments settle out. Substantially the same action is exhibited by tablets formed of the microcrystalline cellulose powders containing the aforementioned additives, except those containing the CMC having a D.S. of at least 0.75±0.15. When these CMC's are present, the tablets begin to swell and disintegrate as they contact the water. In a matter of a few seconds, disintegrated particles become dispersed in the water and after a few minutes particles are dispersed throughout the body of water. Upon agitation, all of the material is dispersed in the water and a substantial portion remains dispersed after agitation is discontinued.

In addition to the functions of the additive as discussed above, the additive should also serve as a protective colloid so as to improve the stability of the colloidally dispersed particles. This is particularly desired where the liquid phase of the colloid is hard water or contains low concentrations of ionic substances such as, for example, where the microcrystalline cellulose is to be utilized in materials like salad dressings, mayonnaise, etc. Since the dispersed cellulose particles carry a very weak negative charge, they are readily flocculated by low concentrations of ionic substances such as salts and acids. The additive, therefore, should be of such nature that it ionizes to produce a charge so that when it is bonded to or attached to the solid particle surface it imparts a greater charge to the dispersed particles. Some gums will attach themselves to the cellulose particles during drying but when the dried particles are redispersed in water the gums, in general, do not impart a charge and, therefore, will not aid in dispersing the particles nor will they aid in stabilizing the colloidal dispersion of the particles in the presence of ionic materials unless present in amounts of at least 20 to 25% by weight. Guar gum, for example, does impart some stability to the colloidally dispersed cellulose particles. Of the possible additives mentioned hereinbefore, only the carboxymethyl celluloses having a D.S. of not exceeding about 0.75±0.15 will function as protective colloids unless excessive amounts are present.

The protective colloid effect of the CMC having a D.S. of 0.75±0.15 is illustrated by forming dispersions in water of disintegrated microcrystalline cellulose and of disintegrated microcrystalline cellulose products having varying proportions of the CMC and noting the concentrations of sodium chloride at which the dispersed material begins to flocculate. Table II which follows sets forth the composition of the dispersed material and the normality at which the dispersed materials flocculated.

TABLE II

| Composition of dispersed solids | | |
| --- | --- | --- |
| Percent microcrystalline cellulose | Percent NaCMC | Flocculation value (normality), NaCl |
| 100 | 0 | Bracketed between $10^{-4}$–$10^{-3}$. |
| 94 | 6 | Bracketed between $10^{-2}$–$10^{-1}$. |
| 90 | 10 | Bracketed between $10^{-1}$–1. |
| 80 | 20 | Bracketed between 3–6. |

It is also desired that the additive impart to the dispersed microcrystalline cellulose particles certain solid-like properties (herein termed "gelling") of elasticity and that the gel formed shows a yield stress. This requires that the particles become more or less linked together into a network. Microcrystalline cellulose particles without CMC when dispersed to form a gel will exhibit a relatively low yield stress, the specific yield stress varying directly with the proportion of microcrystalline cellulose in the dispersion. CMC by itself does not form a gel having a yield stress at these low concentrations. Of the various possible additives, the carboxymethyl celluloses having a D.S. of not exceeding 0.75±0.15 and guar gum will impart the gelling properties of the CMC's having a greater D.S. than this value and substances such as alginates will impart very slight properties of this nature.

The presence of a small proportion of the CMC increases appreciably the yield strength of the gels. As the proportion is increased to about 10% by weight of the mixture of microcrystalline cellulose and CMC, gels are formed having maximum yield stresses. As the proportion exceeds about 10%, then the yield stress decreases. This is illustrated quite clearly in FIG. 1. The microcrystalline cellulose was derived from cotton by hydrolysis with hydrochloric acid as described in U.S. Pat. No. 2,978,446 and subsequent disintegration as described hereinbefore. During the disintegration, carboxymethyl cellulose having a D.S. of 0.75±0.15 was added in various amounts and gels were formed in distilled water by adding 4% by weight of the microcrystalline cellulose and of the microcrystalline cellulose samples containing 10, 20 and 30% CMC. The yield stress was measured on a Rao Instrument Company Flow Birefringence Viscometer. The data was plotted and was shown in FIG. 1.

In a similar manner, microcrystalline cellulose was formed from a dissolving wood pulp and varying amounts of the CMC added during the attrition steps. The various samples were dried and subsequently crushed. Gels were formed of microcrystalline cellulose and of products containing 5, 10 and 15 and 20% CMC (D.S.—0.75±0.15) at 3% solids content and at 4% solids content. The yield stress of the different gels was measured and is shown in FIG. 2.

The specific yield stress as is apparent from the foregoing data is dependent upon the source material, the relative proportions of the microcrystalline cellulose and the CMC and also dependent upon the solids content (microcrystalline cellulose and CMC) dispersed in the liquid. As stated hereinbefore, the CMC component does not possess a yield stress. The microcrystalline cellulose component may impart some yield stress but the specific yield stress is quite low as illustrated in FIGS. 1 and 2. It would be expected therefore that by combining the microcrystalline cellulose and CMC that the yield stress would not exceed that which is imparted by the microcrystalline cellulose. It is quite unexpected therefore to discover that the addition of from about 5% to about 15% carboxymethyl cellulose based on the combined weight would result in so vast an increase in the yield stress.

To further illustrate the radical increase in yield stress of gels containing the product of the present invention, gels were formed containing .2, 3, 4, 5 and 6% solids dispersed in distilled water. Microcrystalline cellulose was formed from a dissolving wood pulp and during the attrition steps carboxymethyl cellulose was added. After attrition, the material was spray dried. The product consisted of 92% microcrystalline cellulose and 8% CMC (D.S.—0.75±0.15). Subsequently, the dried material was added to distilled water and beaten in a blender-type mixer for 5 minutes. Dispersions of microcrystalline cellulose were also formed as above, without adding CMC, containing the proportion which would be contributed by the microcrystalline cellulose of the spray dried product. CMC was also used to prepare solutions containing the same proportions of CMC as contributed by the spray dried product. The yield stresses for these dispersions and solutions were measured and are reported in Table III.

Tracing 1 represents the flow characteristics of the microcrystalline cellulose dispersion. Tracing 2 represents the corresponding properties of the CMC solution. In this instance, the CMC had a D.S. of 0.75±0.15 and a viscosity of 300 to 600 cps. Tracings 1 and 2 exhibit that in the cases of microcrystalline cellulose dispersions and CMC solutions in distilled water there is no appreciable or significant difference, at any given shear gradient, in the shear stress of the dispersion or solution when measured at increasing or decreasing rates of shear. In other words, the shear stresses exhibited with an increasing rate of shear are substantially identical to the shear stresses exhibited with a decreasing rate of shear. Accordingly, the tracings do not show open hysteresis loops.

Tracing 3 represents the characteristics of dispersed microcrystalline cellulose and CMC of the same D.S. value but having a viscosity of 25 to 50 cps. The product contained, by weight, 90% microcrystalline cellulose and 10% CMC. Tracing 4 illustrates the properties of a like microcrystalline cellulose-CMC product, the CMC having the same D.S. value but having a viscosity of 300 to 600 cps. Tracings 3 and 4 exhibit that in the case of dispersions of the microcrystalline cellulose-CMC products, the shear stress, at any given shear gradient other than that at and adjacent the point at which the rate of shear is reversed from an increasing rate to a decreasing rate, is very substantially greater when measured at increasing rates of shear than the shear stress when measured at decreasing rates of shear. In other words, the shear stresses exhibited with an increasing rate of shear are substantially greater than the shear stresses exhibited at a decreasing rate of shear. Accordingly, the tracings show large, open hysteresis loops.

Of the various possible additives, CMC's having a

TABLE III

| | Yield stress (dyne/cm.$^2$) | | |
|---|---|---|---|
| Percent solids | MCC+NaCMC | MCC component | NaCMC component |
| 2% (1.84% MCC+0.16% NaCMC) | 9 | 0 | 0 |
| 3% (2.76% MCC+0.24% NaCMC) | 30 | 2 | 0 |
| 4% (3.68% MCC+0.32% NaCMC) | 75 | 4 | 0 |
| 5% (4.60% MCC+0.40% NaCMC) | 150 | 7 | 0 |
| 6% (5.52% MCC+0.48% NaCMC) | 260 | 12 | 0 |

In addition to the foregoing properties which should be imparted by an additive, it is desirable to utilize a material which in addition to imparting a yield stress, also introduces a time dependent flow behavior or thixotropic properties to the dispersed material. For many purposes such as, for example, for uses in salad dressings, certain thixotropic properties are highly desirable. Neither the microcrystalline cellulose dispersions by themselves nor the CMC solutions in the concentrations discussed herein by themselves exhibit an appreciable time dependent flow behavior. On the other hand, by preparing the microcrystalline cellulose-CMC product as described hereinbefore, the gels possess a very decided and substantial time dependent flow characteristic. This is illustrated in FIG. 3 which represents a recorder chart tracing illustrating the breakdown of microcrystalline cellulose-CMC dispersions, of a microcrystalline cellulose dispersion and of a CMC solution. The dispersions and solution each contained 2% dispersed or dissolved solids.

D.S. of not exceeding 0.75±0.15, guar gum and alginates will impart appreciable flow modifying characteristics to the gels. CMC's having a greater D.S. and other cellulose derivatives such as hydroxyethyl cellulose, methyl cellulose and hydroxypropyl cellulose impart only a very slight flow modification.

It is quite apparent from the foregoing description, that of a very wide range of possible additives only the CMC having a D.S. of 0.75±0.15 impart all five desired characteristics and an increase in yield strength of gels. This is clearly summarized in the following table:

TABLE IV

| | Function fulfilled by the additive | | | | |
|---|---|---|---|---|---|
| Additive at 5-15% use level | Barrier | Dispersant | Protective colloid | Gellant | Flow modifier |
| CMC (D.S. 0.43±0.05) | No | No | Yes | Yes | Yes. |
| CMC (D.S. 0.75±0.15) | Yes | Yes | Yes | Yes | Yes. |
| CMC (D.S. 1.30±0.10) | No | Yes | No | Slight | Slight. |
| HEC | Slight | No | No | No | Do. |
| MC; HPMC | do | No | No | No | Do. |
| Guar gum | do | No | Yes | Yes | Yes. |
| Algin | do | No | No | Slight | Yes. |

HEC—Hydroxyethyl cellulose.
MC—Methyl cellulose.
HPMC—Hydroxypropyl methyl cellulose.

A further unique characteristic of the dried products of this invention is that the yield stresses and gel strengths of gels formed therefrom are substantially higher than the corresponding properties of gels formed of the microcrystalline cellulose-CMC prior to drying. This is clearly illustrated in Table V which follows. In each instance, microcrystalline cellulose was formed from dissolving wood pulps. Attrition and the addition of the CMC were as described hereinabove. Distilled water was added to samples without first drying and beating the mass for 1 minute in an electrically driven blender-type mixer. The yield stresses of the resulting dispersions were then measured. Viscosities were also measured at different shear rates. Portions of the attrited material were air dried in the form of thin films and hand crushed. Gels were formed by adding the air dried, powdered material to distilled water in a blender-type mixer and the mixtures beaten for 1 minute. The yield stress and viscosities at various shear rates were measured. In all instances, the gels contained 5% solids, by weight. The results of these determinations were as follows:

TABLE V.—NEVER DRIED GELS

|  | A | B | C | D | E | F |
|---|---|---|---|---|---|---|
| Microcrystalline cellulose |  | Pulp I |  |  | Pulp II |  |
| CMC*, grade | a | b | a | b | a | b |
| MCC/CMC ratio | 89/11 | 89/11 | 92/8 | 92/8 | 92/8 | 92/8 |
| Yield stress (dyne/cm.²): |  |  |  |  |  |  |
| 1 min | 162 | 132 | 176 | 171 | 231 | 198 |
| 5 min | 325 | 259 | 399 | 382 | 459 | 404 |
| 15 min | 553 | 443 | 636 | 597 | 703 | 598 |
| Shear stress (dyne/cm.²): |  |  |  |  |  |  |
| 105 sec.⁻¹ | 171 | 132 | 176 | 140 | 168 | 164 |
| 525 sec.⁻¹ | 316 | 254 | 298 | 254 | 286 | 274 |
| 1050 sec.⁻¹ | 456 | 369 | 407 | 373 | 400 | 396 |

AIR DRIED RECONSTITUTED GELS

|  | A | B | C | D | E | F |
|---|---|---|---|---|---|---|
| Yield stress (dyne/cm.²): |  |  |  |  |  |  |
| 1 min | 429 | 337 | 324 | 231 | 324 | 215 |
| 5 min | 787 | 669 | 636 | 526 | 720 | 436 |
| 15 min | 1,040 | 897 | 871 | 796 | 993 | 720 |
| Shear stress (dyne/cm.²): |  |  |  |  |  |  |
| 105 sec.⁻¹ | 290 | 282 | 248 | 189 | 253 | 181 |
| 525 sec.⁻¹ | 400 | 412 | 366 | 307 | 375 | 303 |
| 1050 sec.⁻¹ | 460 | 564 | 505 | 438 | 514 | 429 |

*D.S., 0.75±0.15; viscosity, 300–600 cps.

The microcrystalline cellulose (MCC) samples used in the preparation of the gels the properties of which are reported in Table V were prepared from different samples of sulfite process, dissolving wood pulp degraded at different times under semi-commercial conditions. Under these conditions, the precise acid concentration, temperature and time varied slightly. The two different grades of CMC used were commercially available food and pharmaceutical grade products having degrees of substitution and viscosities within the stated ranges. It will be noted that gels A and B were prepared from products having microcrystalline cellulose-CMC ratios different than the corresponding ratios for the other products. These factors account for the specific differences in characteristics of the various gels. The data in the table demonstrate very clearly the substantial increase in gel strengths as reflected in the yield stress and shear stress resulting from the drying of the product. This characteristic is directly opposite that which occurs in the drying of disintegrated microcrystalline cellulose in the absence of the additive.

In the semi-commercial production of microcrystalline cellulose-CMC products comparable to the specific samples used for the preparation of gels C, D, E and F, sulfite process, dissolving wood pulp (95% alpha cellulose) was subjected to an acid hydrolysis in accordance with Pat. No. 2,978,446. Residue of the hydrolysis process was thoroughly washed and the resulting wet filter cake contained 40±2% solids. The wet filter cake was continuously introduced into a high speed paddle mixer at a rate of about 110 pounds per hour based on the dry weight of the microcrystalline cellulose. Simultaneously, air dried CMC was introduced into the mixer in an amount equivalent to 8% based on the dry weight of the microcrystalline cellulose. The mixer consisted essentially of a horizontally mounted cylinder with a rotor having spaced paddles each set at an angle so as to attrite the solids by impact and high shear and move the mass through the cylinder. The specific mixer was a commercially available mixer marketed under the trade name "Turbilizer."

The mass as discharged contained approximately 40.5% cellulose, 3.5% CMC and 56% water and was introduced into a second mixer commercially marketed under the trade name "Rietz Extructor." The mass was moved through a horizontal chamber divided into compartments by perforated plates by means of a screw thread conveyor in the several compartments. As the mass was moved through the chamber, water was added so as to reduce the solids content of the mass to about 30%. In this apparatus, the mass becomes compressed in the several chambers as it is advanced to each perforated plate, is smeared on the perforated plates and is forced through the apertures in the plates all of which result in subjecting the cellulose particles to a high shear and cause a further attrition of the particles. These actions also effect a continuous mixing of the several ingredients. The mass as it issued from the mixer contained 30 to 32% solids.

The mass was fed to the nip of two spaced rotating drying drums heated with steam at about 90 lbs. pressure. The spacing of the drums provided coatings on the drums of a thickness of about 0.01 inch. The dried coating, having a moisture content of 5±2%, was removed by doctor blades and conveyed to a crusher or grinder where the material was pulverized to pass through a 60 mesh screen.

A product with like characteristics was also prepared by spray drying. In this type of processing, the mass as it was discharged from the second mixture was transferred to a slurry tank where water was added to reduce the solids content to 5–6%. After thorough mixing, the slurry was passed through an inline high speed mixer and then to a spray dryer. The slurry was dried using air introduced into the drying chamber at a temperature of about 575° F.

We claim:
1. A method of producing water-insoluble, water-dispersible organic material which comprises forming an intimate mixture of water, disintegrated β-1,4 glucan-containing material at least 1%, by weight, having a particulate size not exceeding about 1 micron, the β-1,4 glucan-containing material consisting of a major proportion of β-1,4 glucan, and sodium carboxymethyl cellulose having a D.S. of 0.75±0.15, the amount of sodium carboxymethyl cellulose being from about 5% to about 15% based on the combined weight of the β-1,4 glucan-containing material and the sodium carboxymethyl cellulose, drying the mixture and recovering water-insoluble, water-dispersible particles capable of forming an aqueous gel wherein at least 1%, by weight, of the dispersed particles have a particle size not exceeding about 1 micron.

2. A method as defined in claim 1 wherein the β-1,4 glucan-containing material is disintegrated in the presence of the sodium carboxymethyl cellulose.

3. A method as defined in claim 1 wherein the β-1,4 glucan-containing material is disintegrated in the presence of water and subsequently the sodium carboxymethyl cellulose is added to and thoroughly mixed with the disintegrated mass.

4. In a method as defined in claim 1 wherein the β-1,4 glucan-containing material is attrited in the presence of water, the mass containing from about 35% to about 60% β-1,4 glucan-containing material, the sodium carboxymethyl cellulose is added to the mass while continuing the attrition, and water is added to the mass so as to reduce the solids content to within the range of between about 25% and 35% while continuing the attrition.

5. In a method as defined in claim 4 wherein, after the solids content of the mass has been reduced to between about 25% and 35%, attrition is continued until at least about 30% of the β-1,4 glucan-containing material has been reduced to a particle size of not exceeding about 1.0 micron.

6. In a method as defined in claim 4 wherein the disintegrated mass having a solids content of between 25% and 35% by weight is spread on a surface in the form of a thin layer, the layer is dried and the dried layer is subsequently pulverized.

7. In a method as defined in claim 4 wherein the disintegrated mass having a solids content of between about 25% and 35% by weight of solids is diluted with water to a solids content of between about 3% and 10% and the diluted mass is then spray dried.

8. As an article of manufacture, a water-insoluble, water-dispersible powder comprising, by weight, from about 85 to about 95 parts of disintegrated β-1,4 glucan-containing material and from about 15 to about 5 parts of sodium carboxymethyl cellulose having a D.S. of 0.75±0.15 intimately associated with the disintegrated β-1,4 glucan-containing material, the powder being characterized in forming, in water, a stable, thixotropic gel wherein at least 1% by weight of the dispersed particles have a particle size not exceeding 1 micron.

9. An article of manufacture as defined in claim 8 being characterized in forming, in water, a stable thixotropic gel wherein at least 30% of the dispersed particles have a particle size not exceeding 1.0 micron.

References Cited
UNITED STATES PATENTS 2,978,446 4/1961 Battista et al. _____ 260—212
3,442,676 5/1969 Belfort _____ 106—271

ALLAN LIEBERMAN, Primary Examiner

U.S. Cl. X.R.

106—163, 168; 260—212